(12) United States Patent
Vu et al.

(10) Patent No.: US 11,398,856 B2
(45) Date of Patent: Jul. 26, 2022

(54) BEAMFORMING TECHNIQUES TO CHOOSE TRANSCEIVERS IN A WIRELESS MESH NETWORK

(71) Applicant: Advanced Micro Devices, Inc., Sunnyvale, CA (US)

(72) Inventors: Ngoc Vinh Vu, Cupertino, CA (US); Carson Ryley Reece Green, Austin, TX (US); Neil Patrick Kelly, Austin, TX (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 0 days.

(21) Appl. No.: 15/832,448

(22) Filed: Dec. 5, 2017

(65) Prior Publication Data
US 2019/0173544 A1 Jun. 6, 2019

(51) Int. Cl.
*H04B 7/06* (2006.01)
*H04L 27/06* (2006.01)
(Continued)

(52) U.S. Cl.
CPC ......... *H04B 7/0617* (2013.01); *H04B 17/318* (2015.01); *H04L 27/06* (2013.01); *H04W 52/346* (2013.01)

(58) Field of Classification Search
CPC ..... H04B 7/0617; H04W 52/346; H04L 27/06
See application file for complete search history.

(56) References Cited

U.S. PATENT DOCUMENTS

| 5,335,010 A | 8/1994 | Lindemeier et al. |
| 5,818,543 A | 10/1998 | Lee |
| (Continued) |

FOREIGN PATENT DOCUMENTS

| WO | 2009156366 A1 | 12/2009 |
| WO | 2011087905 A1 | 7/2011 |

OTHER PUBLICATIONS

Final Office Action in U.S. Appl. No. 15/686,927, dated Feb. 27, 2018, 15 pages.
(Continued)

*Primary Examiner* — Ian N Moore
*Assistant Examiner* — Rushil Parimal Sampat
(74) *Attorney, Agent, or Firm* — Kowert Hood Munyon Rankin and Goetzel PC; Rory D. Rankin (57) ABSTRACT

Systems, apparatuses, and methods for implementing beamforming techniques to choose transceivers in a wireless mesh network are disclosed. Multiple transceivers are deployed in a wireless virtual reality (VR) environment to provide a high quality path to send an encoded video stream from a graphics source to a head-mounted display (HMD) receiver. When a master transceiver connected to the graphics source does not have a line of sight connection to the HMD, the master transmitter sends the encoded video stream on a path though one or more passive transceivers that have good line of sight connections on the path to the HMD. To determine the quality of the wireless links between the various transceivers and the HMD, beamforming training procedures are performed. These beamforming training procedures are implemented to determine how to route the encoded video stream from the master transceiver to the HMD.

19 Claims, 8 Drawing Sheets

(51) Int. Cl.
*H04W 52/34* (2009.01)
*H04B 17/318* (2015.01)

(56) References Cited

U.S. PATENT DOCUMENTS

| | | | |
|---|---|---|---|
| 5,860,056 A | 1/1999 | Pond | |
| 6,414,960 B1 | 7/2002 | Kuhn et al. | |
| 7,336,959 B2 * | 2/2008 | Khitrik | H04L 12/28 455/432.3 |
| 7,479,981 B2 | 1/2009 | Tierney et al. | |
| 7,596,359 B2 | 9/2009 | Kimoto et al. | |
| 7,715,634 B2 | 5/2010 | Lei et al. | |
| 7,881,258 B2 | 2/2011 | Gilbert et al. | |
| 8,300,563 B2 | 10/2012 | Krishnaswamy et al. | |
| 8,365,238 B2 | 1/2013 | Reznic et al. | |
| 8,422,961 B2 | 4/2013 | Kafle | |
| 8,457,026 B1 | 6/2013 | Ho et al. | |
| 8,976,220 B2 * | 3/2015 | Maxwell | H04N 7/15 348/14.07 |
| 9,450,620 B1 | 9/2016 | Ahmed et al. | |
| 9,716,537 B2 | 7/2017 | Mammoser et al. | |
| 9,786,985 B2 | 10/2017 | Kim et al. | |
| 9,799,954 B2 | 10/2017 | Preradovic et al. | |
| 9,948,413 B1 * | 4/2018 | Zhou | H04B 17/14 |
| 10,312,980 B2 | 6/2019 | Maamari et al. | |
| 10,523,295 B2 | 12/2019 | Kasher et al. | |
| 10,582,458 B2 | 3/2020 | Sadek et al. | |
| 10,680,927 B2 | 6/2020 | Vu | |
| 10,871,559 B2 | 12/2020 | Vu et al. | |
| 10,959,111 B2 | 3/2021 | Stark, Jr. et al. | |
| 2003/0072376 A1 | 4/2003 | Krishnamachari et al. | |
| 2003/0124977 A1 * | 7/2003 | Smith | H04W 88/04 455/16 |
| 2004/0081238 A1 | 4/2004 | Parhy | |
| 2004/0196919 A1 | 10/2004 | Mehta et al. | |
| 2004/0204103 A1 | 10/2004 | Rouphael | |
| 2005/0185097 A1 | 8/2005 | Takatori et al. | |
| 2006/0017843 A1 | 1/2006 | Shi et al. | |
| 2006/0209890 A1 | 9/2006 | MacMullan et al. | |
| 2006/0209892 A1 | 9/2006 | MacMullan et al. | |
| 2006/0212911 A1 | 9/2006 | MacMullan et al. | |
| 2006/0262985 A1 | 11/2006 | Chen et al. | |
| 2007/0147492 A1 | 6/2007 | Marquant et al. | |
| 2007/0223380 A1 | 9/2007 | Gilbert et al. | |
| 2008/0064425 A1 | 3/2008 | Kim et al. | |
| 2008/0088635 A1 | 4/2008 | Callway et al. | |
| 2008/0144713 A1 | 6/2008 | Kimmich et al. | |
| 2009/0150943 A1 * | 6/2009 | Vasudevan | H04N 21/2385 725/86 |
| 2009/0213940 A1 | 8/2009 | Steinbach et al. | |
| 2010/0009635 A1 | 1/2010 | Qin et al. | |
| 2010/0150252 A1 | 6/2010 | Camp, Jr. et al. | |
| 2010/0214169 A1 | 8/2010 | Kafle | |
| 2011/0058104 A1 | 3/2011 | Arai | |
| 2011/0070928 A1 | 3/2011 | Hsu et al. | |
| 2011/0129025 A1 | 6/2011 | Jaeckel et al. | |
| 2011/0151790 A1 | 6/2011 | Khandekar et al. | |
| 2011/0286545 A1 | 11/2011 | Guignard et al. | |
| 2012/0276896 A1 | 11/2012 | Ren et al. | |
| 2012/0307934 A1 | 12/2012 | Heidari et al. | |
| 2012/0327115 A1 | 12/2012 | Chhetri et al. | |
| 2013/0115887 A1 | 5/2013 | Kwon et al. | |
| 2013/0194950 A1 | 8/2013 | Haghighat et al. | |
| 2013/0242117 A1 | 9/2013 | Luo et al. | |
| 2014/0010319 A1 | 1/2014 | Baik et al. | |
| 2014/0126620 A1 | 5/2014 | Maltsev et al. | |
| 2014/0266900 A1 | 9/2014 | Kasher | |
| 2014/0269937 A1 | 9/2014 | Wadsworth et al. | |
| 2014/0368667 A1 | 12/2014 | Peterson et al. | |
| 2015/0110167 A1 | 4/2015 | Chen et al. | |
| 2015/0289147 A1 | 10/2015 | Lou et al. | |
| 2015/0333994 A1 | 11/2015 | Gell et al. | |
| 2015/0341646 A1 | 11/2015 | Sze et al. | |
| 2016/0105229 A1 | 4/2016 | Trainin et al. | |
| 2016/0134485 A1 | 5/2016 | Thapliya et al. | |
| 2016/0149633 A1 | 5/2016 | Sanderovich et al. | |
| 2016/0227229 A1 | 8/2016 | Wadsworth | |
| 2016/0227432 A1 | 8/2016 | Freeman et al. | |
| 2016/0301770 A1 | 10/2016 | Marra et al. | |
| 2016/0337150 A1 | 11/2016 | Larsson et al. | |
| 2017/0026263 A1 | 1/2017 | Gell et al. | |
| 2017/0127408 A1 | 5/2017 | Du | |
| 2017/0134076 A1 | 5/2017 | Maamari et al. | |
| 2017/0141885 A1 | 5/2017 | Bontu et al. | |
| 2017/0156067 A1 | 6/2017 | Huang | |
| 2017/0187437 A1 * | 6/2017 | Cariou | H04B 7/0417 |
| 2017/0207839 A1 | 7/2017 | Eitan et al. | |
| 2017/0222704 A1 | 8/2017 | Eitan et al. | |
| 2017/0251484 A1 | 8/2017 | Negus et al. | |
| 2017/0264350 A1 | 9/2017 | Sanderovich et al. | |
| 2018/0027420 A1 | 1/2018 | Takahashi et al. | |
| 2018/0062719 A1 | 3/2018 | Verma et al. | |
| 2018/0074188 A1 | 3/2018 | Polo et al. | |
| 2018/0093177 A1 * | 4/2018 | Tokubo | G06F 3/012 |
| 2018/0123901 A1 | 5/2018 | Yermakov et al. | |
| 2018/0137412 A1 | 5/2018 | Nikkhah et al. | |
| 2018/0198506 A1 | 7/2018 | Sanderovich et al. | |
| 2018/0199256 A1 | 7/2018 | Sanderovich et al. | |
| 2018/0205423 A1 | 7/2018 | Sanderovich et al. | |
| 2018/0227027 A1 | 8/2018 | Trainin et al. | |
| 2018/0234860 A1 | 8/2018 | Kasher et al. | |
| 2018/0248603 A1 | 8/2018 | Kasher et al. | |
| 2018/0288635 A1 | 10/2018 | Kaushik et al. | |
| 2019/0036572 A1 | 1/2019 | Kasher et al. | |
| 2019/0068473 A1 | 2/2019 | Vu et al. | |
| 2019/0101638 A1 | 4/2019 | Vu et al. | |
| 2019/0104276 A1 | 4/2019 | Vu et al. | |
| 2019/0104458 A1 | 4/2019 | Svennebring et al. | |
| 2019/0158156 A1 | 5/2019 | Da Silva et al. | |
| 2019/0199467 A1 | 6/2019 | Vu | |
| 2019/0215256 A1 | 7/2019 | Dhanabalan et al. | |
| 2019/0230185 A1 | 7/2019 | Dhanabalan et al. | |
| 2019/0261209 A1 | 8/2019 | Balasubramanian et al. | |
| 2019/0364449 A1 | 11/2019 | Yang et al. | |
| 2020/0280862 A1 | 9/2020 | Stark, Jr. et al. | |

OTHER PUBLICATIONS

Non-Final Office Action in U.S. Appl. No. 15/686,927, dated Nov. 1, 2017, 16 pages.

Vu et al., U.S. Appl. No. 15/686,927, entitled "Custom Beamforming During a Vertical Blanking Interval", filed Aug. 25, 2017, 31 pages.

Vu, Ngoc Vinh, U.S. Appl. No. 15/686,934, entitled "Adaptive Beam Assessment to Predict Available Link Bandwidth", filed Aug. 25, 2017, 29 pages.

Non-Final Office Action in U.S. Appl. No. 15/686,927, dated Aug. 8, 2018, 19 pages.

International Search Report and Written Opinion in International Application No. PCT/US2018/052350, dated Dec. 14, 2018, 13 pages.

Van Der Schaar et al., "Robust Transmission of MPEG-4 Scalable Video Over 4G Wireless Networks", International Conference on Image Processing, Sep. 22, 2002, pp. 757-760, vol. 3, IEEE.

International Search Report and Written Opinion in International Application No. PCT/US2018/052373, dated Jan. 7, 2019, 13 pages.

Vu, Ngoc Vinh, U.S. Appl. No. 15/852,833, entitled "Video Codec Data Recovery Techniques for Lossy Wireless Links", filed Dec. 22, 2017, 36 pages.

Non-Final Office Action in U.S. Appl. No. 15/686,927, dated Jun. 11, 2019, 12 pages.

Non-Final Office Action in U.S. Appl. No. 15/721,125, dated Feb. 20, 2019, 9 pages.

Non-Final Office Action in U.S. Appl. No. 15/852,833, dated May 31, 2019, 11 pages.

Final Office Action in U.S. Appl. No. 15/686,927, dated Jan. 17, 2019, 17 pages.

Non-Final Office Action in U.S. Appl. No. 15/686,934, dated Jan. 25, 2019, 8 pages.

Final Office Action in U.S. Appl. No. 15/721,125, dated Sep. 10, 2019, 9 pages.

(56) References Cited

OTHER PUBLICATIONS

Final Office Action in U.S. Appl. No. 15/686,927, dated Oct. 2, 2019, 7 pages.
Final Office Action in U.S. Appl. No. 15/852,833, dated Oct. 3, 2019, 12 pages.
Final Office Action in U.S. Appl. No. 15/686,934, dated Oct. 16, 2019, 9 pages.
Non-Final Office Action in U.S. Appl. No. 15/686,927, dated Jan. 7, 2020, 10 pages.
Non-Final Office Action in U.S. Appl. No. 15/721,125, dated Jan. 7, 2020, 10 pages.
Non-Final Office Action in U.S. Appl. No. 15/852,833, dated Apr. 17, 2020, 12 pages.
Notice of Allowance in U.S. Appl. No. 15/686,927, dated Feb. 24, 2021, 6 pages.
Non-Final Office Action in U.S. Appl. No. 15/721,125, dated Mar. 11, 2021, 11 pages.
Notice of Allowance in U.S. Appl. No. 15/686,927, dated Jun. 8, 2021, 6 pages.
Office Action in Korean Patent Application No. 10-2020-7019190, dated Nov. 4, 2021, 11 pages.

* cited by examiner

BEAMFORMING TECHNIQUES TO CHOOSE TRANSCEIVERS IN A WIRELESS MESH NETWORK

BACKGROUND

Description of the Related Art

A wireless communication link can be used to send a video stream from a computer (or other device) to a virtual reality (VR) headset (or head mounted display (HMD)). Transmitting the VR video stream wirelessly eliminates the need for a cable connection between the computer and the user wearing the HMD, thus allowing for unrestricted movement by the user. A traditional cable connection between a computer and HMD typically includes one or more data cables and one or more power cables. Allowing the user to move around without a cable tether and without having to be cognizant of avoiding the cable creates a more immersive VR system. Sending the VR video stream wirelessly also allows the VR system to be utilized in a wider range of applications than previously possible.

However, a VR application is a low latency application which does not typically buffer video data. For example, when the user moves their head, this is detected by the HMD or console, and then the subsequently rendered video frames are updated to reflect the new viewing position of the user. Additionally, changing conditions of the link can affect video quality. When the link deteriorates and video data is lost or corrupted, this can result in a poor user experience. Accordingly, improved techniques for wireless streaming of data are desired.

BRIEF DESCRIPTION OF THE DRAWINGS

The advantages of the methods and mechanisms described herein may be better understood by referring to the following description in conjunction with the accompanying drawings, in which.

DETAILED DESCRIPTION OF EMBODIMENTS

In the following description, numerous specific details are set forth to provide a thorough understanding of the methods and mechanisms presented herein. However, one having ordinary skill in the art should recognize that the various embodiments may be practiced without these specific details. In some instances, well-known structures, components, signals, computer program instructions, and techniques have not been shown in detail to avoid obscuring the approaches described herein. It will be appreciated that for simplicity and clarity of illustration, elements shown in the figures have not necessarily been drawn to scale. For example, the dimensions of some of the elements may be exaggerated relative to other elements.

Various systems, apparatuses, methods, and computer-readable mediums for utilizing beamforming techniques to choose transceivers in a wireless mesh network are disclosed herein. In one embodiment, a wireless communication system includes a plurality of transceivers and a receiver. In one embodiment, a master transceiver is coupled to a video source which is configured to render and encode a video stream. In one embodiment, the video stream represents a virtual reality (VR) rendered environment. The master transceiver is configured to wirelessly transmit the encoded video stream on a path through the plurality of transceivers to the receiver.

In a wireless VR environment, when a master transceiver and receiver (e.g., head-mounted display (HMD)) can see other and have a line of sight connection which is devoid of obstructions, then the master transceiver sends the encoded video stream directly to the receiver. But, when the master transceiver and the receiver do not have a line of sight connection, such as when some obstruction gets in between the master transceiver and the receiver, then the link quality is degraded, and the data bit rate will be decreased. In order to mitigate this scenario, multiple transceivers are deployed in the VR environment. For example, in one embodiment, when the VR environment is a room or office, a different transceiver is deployed in each corner of the room. In this deployment, only one of the transceivers will connect to the video source (e.g., the graphics card), and this transceiver is referred to as the master transceiver.

In one embodiment, the wireless VR environment includes one master transceiver and a plurality of passive transceivers. Multiple transceivers can be utilized to transfer the video data from the master transceiver to the receiver. For example, if transceiver #4 has the best line of sight to the receiver, then the master transceiver can transfer to transceiver #2, then from transceiver #2 to transceiver #4, and then from transceiver #4 to the HMD. In other embodiments, other paths from the master transceiver to the receiver can be utilized.

In one embodiment, the best links to use among the different transceivers are determined during one or more beamforming training procedures. During beamforming training, the system determines which transceiver has the best line of sight link to the receiver. Then, the best path from the master transceiver to this transceiver is determined within the mesh network of transceivers. In one embodiment, beamforming training procedures are performed on a predefined schedule. In this embodiment, the transceivers and the receiver are synchronized in time, allowing the transceivers and the receivers to start the beamforming training procedure at the same time. In this embodiment, each transceiver turns on an omni-directional antenna and transmits at the same time and at the same power, and the receiver scans the received signals in a 360 degree arc to determine the direction of the strongest signal. In one scenario, in the VR environment, the receiver knows the location of the transceivers, and so the receiver can determine which transceiver has the best line of sight to the receiver based on the direction of the strongest received signal. Then, this transceiver is utilized to transfer the video data to the receiver.

In another scenario, the transceivers can utilize different channels to transmit during the beamforming training procedure(s). For example, the receiver can turn on an omnidirectional antenna, and each transceiver transmits on a different channel, and then the receiver can determine which channel has the strongest received signal. In a further embodiment, the transceivers are scheduled to transmit at different times, and then the receiver measures the signal strength of each of the transceivers to determine which transceiver has the highest signal strength. Then, this transceiver is used to send the video data to the receiver.

Figure 1:
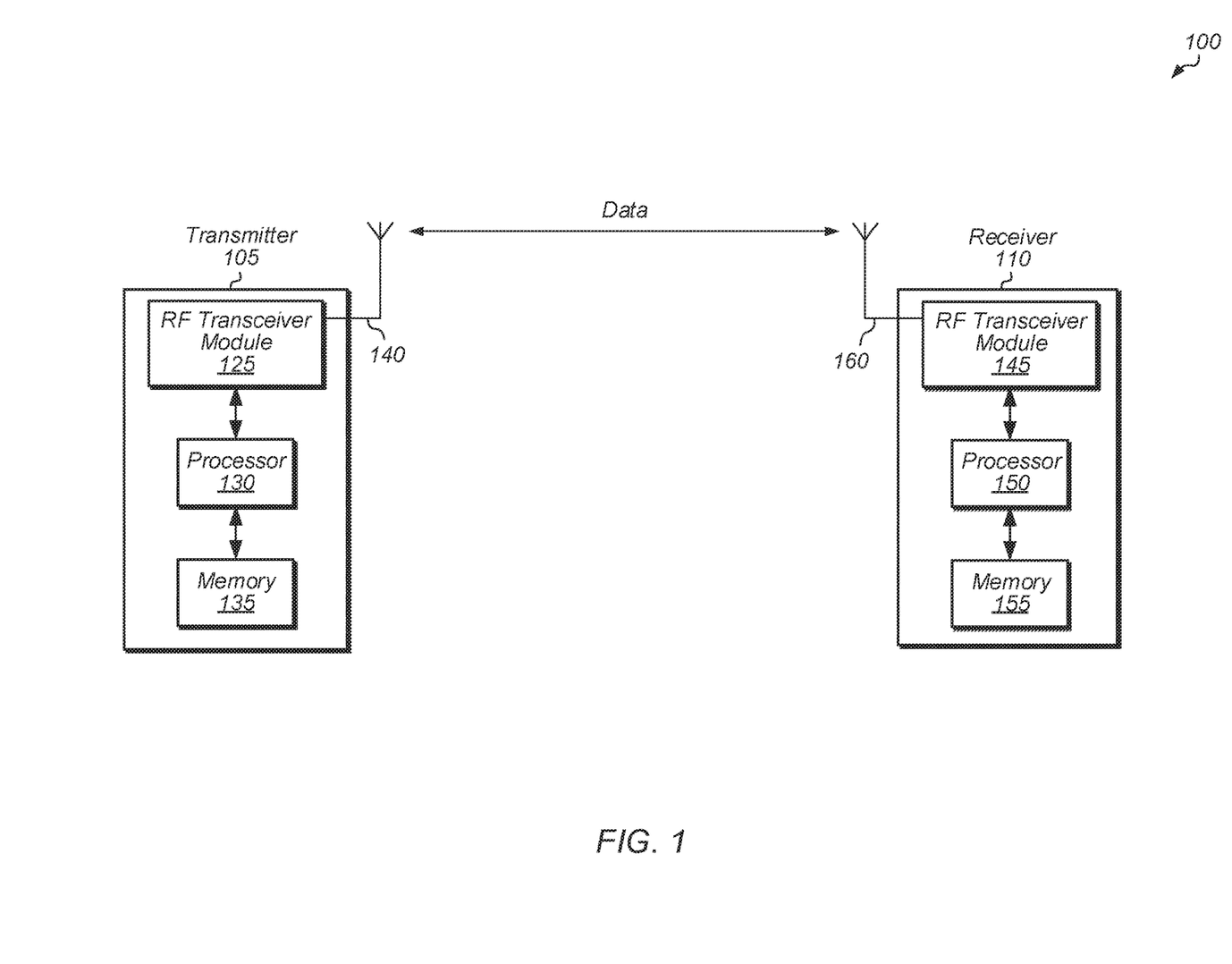
FIG. 1 is a block diagram of one embodiment of a system.

Referring now to FIG. 1, a block diagram of one embodiment of a system 100 is shown. System 100 includes at least a first communications device (e.g., transmitter 105) and a second communications device (e.g., receiver 110) operable to communicate with each other wirelessly. It is noted that receiver 110 can also transmit data and/or acknowledgments to transmitter 105. Accordingly, transmitter 105 and receiver 110 can also be referred to as transceivers. In one embodiment, transmitter 105 and receiver 110 communicate wirelessly over the unlicensed 60 Gigahertz (GHz) frequency band. For example, transmitter 105 and receiver 110 can communicate in accordance with the Institute of Electrical and Electronics Engineers (IEEE) 802.11ad standard (i.e., WiGig). In other embodiments, transmitter 105 and receiver 110 can communicate wirelessly over other frequency bands and/or by complying with other wireless communication standards.

Wireless communication devices that operate within extremely high frequency (EHF) bands, such as the 60 GHz frequency band, are able to transmit and receive signals using relatively small antennas. However, such signals are subject to high atmospheric attenuation when compared to transmissions over lower frequency bands. In order to reduce the impact of such attenuation and boost communication range, EHF devices typically incorporate beamforming technology. For example, the IEEE 802.11ad specification details a beamforming training procedure, also referred to as sector-level sweep (SLS), during which a wireless station tests and negotiates the best transmit and/or receive antenna combinations with a remote station. In various embodiments, transmitter 105 and receiver 110 are configured to perform periodic beamforming training procedures to determine the transmit and/or receive antenna combinations for wireless data transmission.

Transmitter 105 and receiver 110 are representative of any type of communication devices and/or computing devices. For example, in various embodiments, transmitter 105 and/or receiver 110 can be a mobile phone, tablet, computer, server, television, game console, head-mounted display (HMD), another type of display, router, or other types of computing or communication devices. In various embodiments, system 100 is configured to execute latency sensitive applications. For example, in one embodiment, system 100 executes a virtual reality (VR) application for wirelessly transmitting frames of a rendered virtual environment from transmitter 105 to receiver 110. In other embodiments, other types of latency sensitive applications can be implemented by system 100 that take advantage of the methods and mechanisms described herein.

In one embodiment, transmitter 105 includes at least radio frequency (RF) transceiver module 125, processor 130, memory 135, and antenna 140. RF transceiver module 125 is configured to transmit and receive RF signals. In one embodiment, RF transceiver module 125 is a mm-wave transceiver module operable to wirelessly transmit and receive signals over one or more channels in the 60 GHz band. RF transceiver module 125 converts baseband signals into RF signals for wireless transmission, and RF transceiver module 125 converts RF signals into baseband signals for the extraction of data by transmitter 105. It is noted that RF transceiver module 125 is shown as a single unit for illustrative purposes. It should be understood that RF transceiver module 125 can be implemented with any number of different units (e.g., chips) depending on the embodiment. Similarly, processor 130 and memory 135 are representative of any number and type of processors and memory devices, respectively, that can be implemented as part of transmitter 105.

Transmitter 105 also includes antenna 140 for transmitting and receiving RF signals. Antenna 140 represents one or more antennas, such as a phased array, a single element antenna, a set of switched beam antennas, etc., that can be configured to change the directionality of the transmission and reception of radio signals. As an example, antenna 140 includes one or more antenna arrays, where the amplitude or phase for each antenna within an antenna array can be configured independently of other antennas within the array. Although antenna 140 is shown as being external to transmitter 105, it should be understood that antenna 140 can be included internally within transmitter 105 in various embodiments. Additionally, it should be understood that transmitter 105 can also include any number of other components which are not shown to avoid obscuring the figure. Similar to transmitter 105, the components implemented within receiver 110 include at least RF transceiver module 145, processor 150, memory 155, and antenna 160, which are similar to the components described above for transmitter 105. It should be understood that receiver 110 can also include or be coupled to other components (e.g., a display).

In cases where transmitter 105 is connected to a video source (e.g., graphics card), transmitter 105 can be referred to as a "master transmitter". Although not shown in FIG. 1, one or more other transmitters can also be included within system 100 as passive transmitters. These passive transmitters can be utilized when the link between transmitter 105 and receiver 110 deteriorates. In a typical wireless virtual reality (VR) environment, the link between transmitter 105 and receiver 110 has capacity characteristics that fluctuate with variations in the environment. For example, in cases where receiver 110 is mobile, various obstructions can interfere with the wireless link between transmitter 105 and receiver 110. When this happens, system 100 can perform a beamforming training procedure to find another path from the master transmitter through the passive transmitters for sending the encoded video stream to receiver 110. The remainder of this disclosure describes various techniques for utilizing a wireless mesh network to mitigate the fluctuating capacity characteristics of the link between a master transmitter and a receiver.

Figure 2:
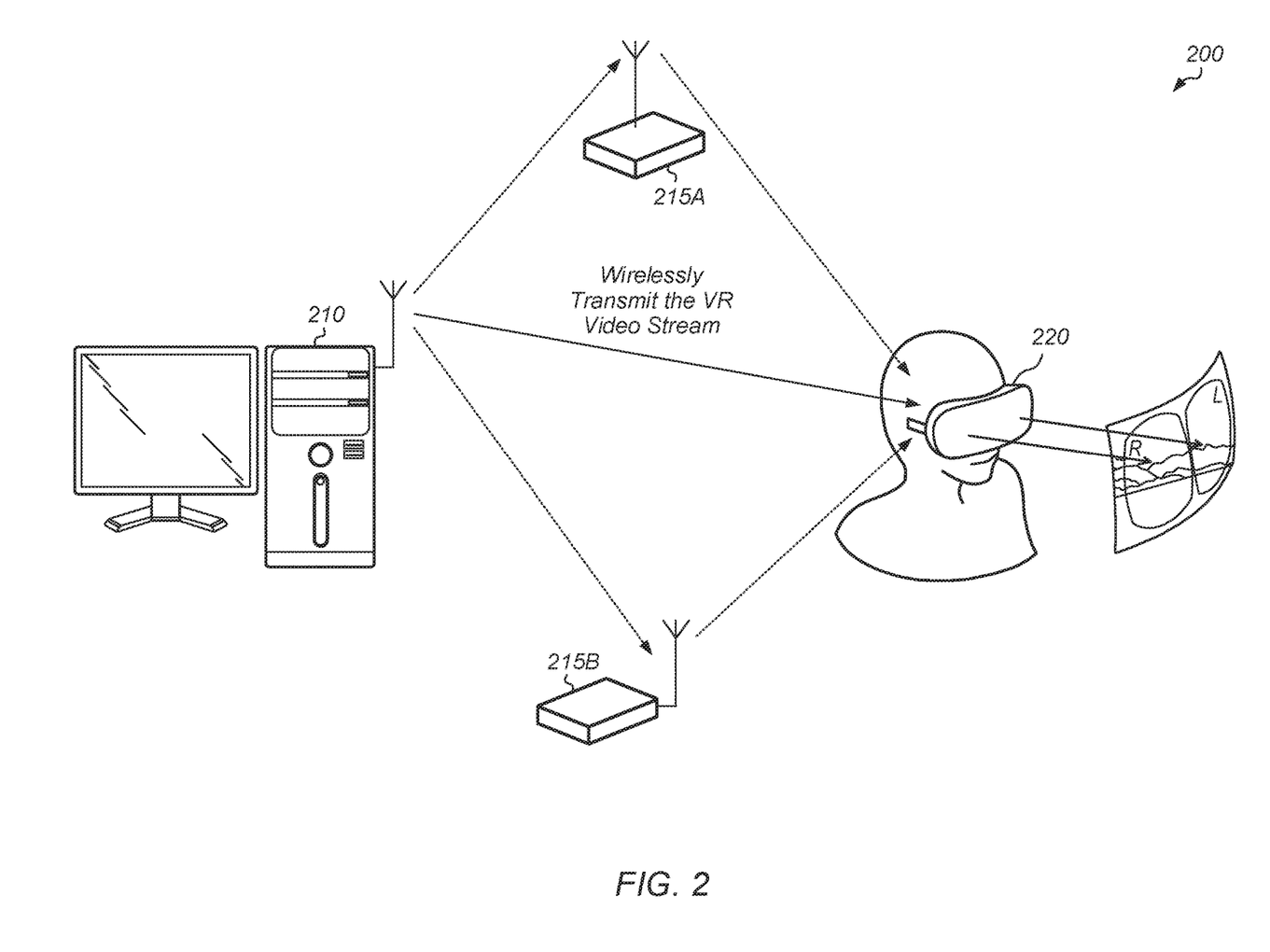
FIG. 2 is a block diagram of one embodiment of a wireless virtual reality (VR) system.

Turning now to FIG. 2, a block diagram of one embodiment of a wireless virtual reality (VR) system 200 is shown. System 200 includes at least computer 210, transceivers 215A-B, and head-mounted display (HMD) 220. Computer 210 is representative of any type of computing device which includes one or more processors, memory devices, input/output (I/O) devices, RF components, antennas, and other components indicative of a personal computer or other computing device. In other embodiments, other computing devices, besides a personal computer, can be utilized to send video data wirelessly to head-mounted display (HMD) 220.

For example, computer 210 may be a gaming console, smart phone, set top box, television set, video streaming device, wearable device, a component of a theme park amusement ride, or otherwise.

Transceivers 215A-B are representative of any number and type of transceivers that can be included within the environment of wireless VR system 200 to facilitate connections when computer 210 and HMD 220 are unable to communicate directly. In one embodiment, transceivers 215A-B are located in corners of the room. In other embodiments, transceivers 215A-B can be located in other locations that have good line-of-sight connections to most locations within the VR environment. As the user wearing HMD 220 moves around in the VR environment, various obstructions can get block the link between computer 210 and HMD 220. When this occurs, computer 210 sends the encoded video stream on a path to a transceiver 215A-B with a line of sight link to HMD 220. As used herein, a "line-of-sight link" is defined as a link where no obstructions exist between two wireless transceivers, allowing wireless communication to be performed with a low probability of data loss.

Computer 210, transceivers 215A-B, and HMD 220 each include circuitry and/or components to communicate wirelessly. It should be understood that while computer 210 and transceivers 215A-B are shown as having external antennas, this is shown merely to illustrate that the video data is being sent wirelessly. It should be understood that computers 210 and transceivers 215A-B can have internal antennas. Additionally, while computer 210 can be powered using a wired power connection, HMD 220 is typically battery powered. Alternatively, computer 210 can be a laptop computer, or other mobile computing device, powered by a battery.

In one embodiment, computer 210 includes circuitry configured to dynamically render a representation of a VR environment to be presented to a user wearing HMD 220. For example, in one embodiment, computer 210 includes one or more graphics processing units (GPUs) to render a VR environment. In other embodiments, computer 210 can include other types of processors, including a central processing unit (CPU), application specific integrated circuit (ASIC), field programmable gate array (FPGA), digital signal processor (DSP), or another processor type. HMD 220 includes circuitry to receive and decode a compressed bit stream sent by computer 210 (or one of transceivers 215A-B) to generate frames of the rendered VR environment. HMD 220 then drives the generated frames to the display integrated within HMD 220.

After rendering a frame of a virtual environment video stream, computer 210 encodes (i.e., compresses) the rendered frame and then sends the encoded frame wirelessly to HMD 220 or to one of transceivers 215A-B if the direct wireless link to HMD 220 is deemed less than desirable. In one embodiment, HMD 220, computer 210, and transceivers 215A-B are configured to perform a beamforming training procedure to determine a path for wirelessly sending each encoded frame from computer 210 to HMD 220. The selected path can change over time as operating conditions vary, and so HMD 220, computer 210, and transceivers 215A-B are configured to perform periodic beamforming training procedures to update the path from computer 210 to HMD 220.

Figure 3:
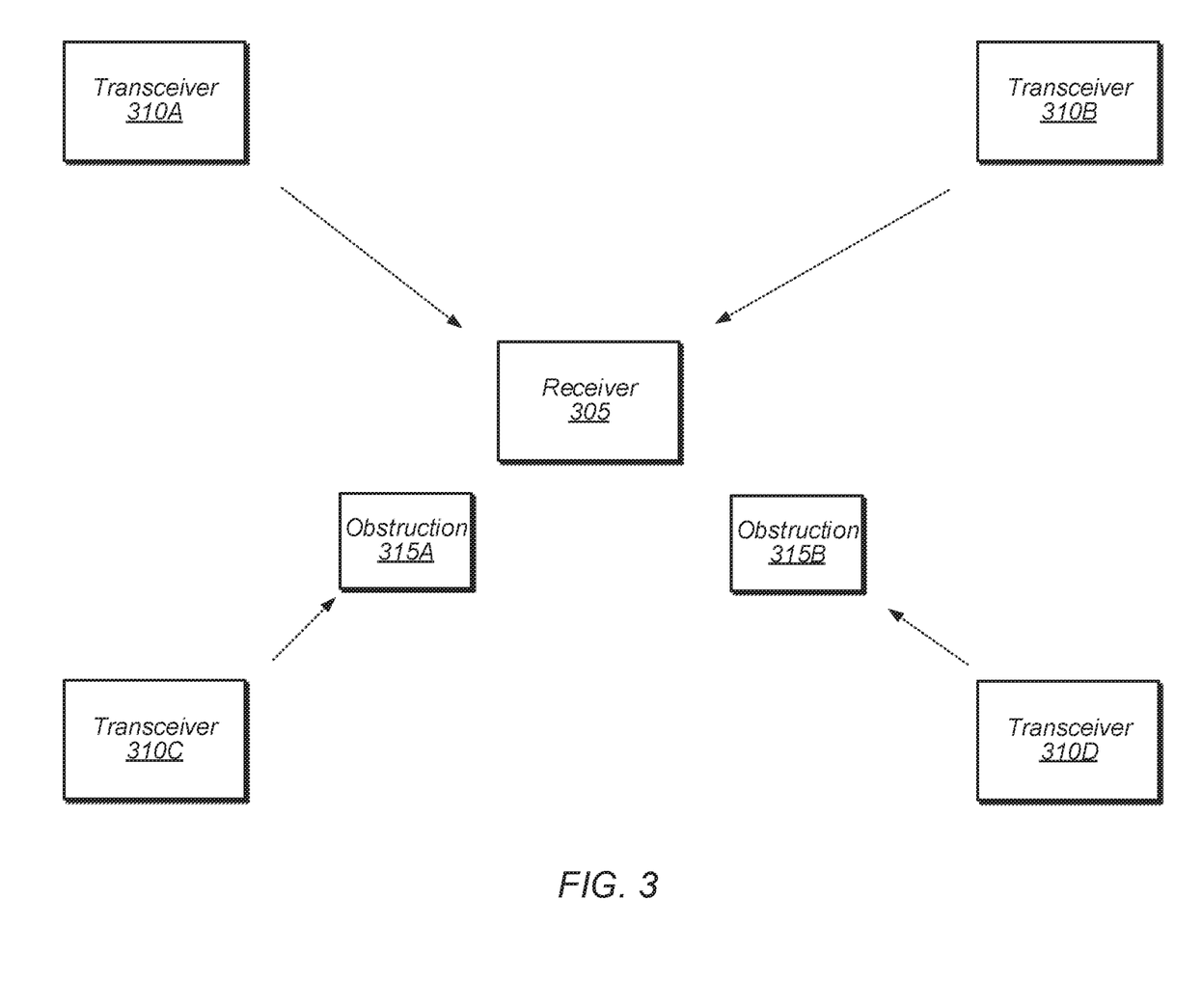
FIG. 3 is a block diagram of one embodiment of performing a beamforming training procedure to determine which transceiver has the best link to the receiver.

Referring now to FIG. 3, a block diagram of one embodiment of performing a beamforming training procedure to determine which transceiver has the best link to the receiver 305 is shown. In one embodiment, receiver 305 is a HMD configured to receive an encoded video bitstream, decode the video bitstream, and then drive the video to the display. In other embodiments, receiver 305 can be implemented as part of other types of devices.

In various embodiments, receiver 305 is a wireless receiver, and the user wearing receiver 305 is able to move around the VR environment. Accordingly, the quality of the links between receiver 305 and the transceivers 310A-N can vary over time as the position between receiver 305 and each of transceivers 310A-N changes. For example, one or more obstructions 315A-B can be present in the VR environment, and as the location of receiver 305 changes, the obstructions 315A-B can interfere with the wireless link between receiver 305 and one or more of transceivers 310A-N.

Accordingly, to maintain a high quality link between the video source and receiver 305 within a changing VR environment, receiver 305 and transceivers 310A-N perform periodic beamforming training procedures to determine the quality of the links between devices. In one embodiment, receiver 305 can initiate a beamforming training procedure by notifying transceivers 310A-N. In another embodiment, beamforming training procedures can be performed on a fixed schedule. In this embodiment, receiver 305 and transceivers 310A-N are synchronized in time so that the beamforming training procedures can be initiated at specific times.

In one embodiment, performing a beamforming training procedure entails each transceiver 310A-N turning on an omni-directional antenna and transmitting with the same power output. Receiver 305 scans the receiver beam in a 360 degree span of the environment to determine where the strongest signal is coming from. In one embodiment, when receiver 305 is a HMD, the orientation of the HMD is being monitored so as to render the VR environment based on the user's head movements. In this embodiment, each transceiver 310A-N is in a fixed location, and since the location and orientation of receiver 305 is known, this allows receiver 305 to determine which transceiver 310 generated the strongest signal. This transceiver 310 is then identified as the transceiver with the best link to receiver 305, and the encoded video stream will be routed through this transceiver 310 to be sent wirelessly to receiver 305. In another embodiment, each transceiver 310A-N uses a separate channel to transmit a signal. For example, transceiver 310A utilizes a first channel, transceiver 310B utilizes a second channel, and so on. In this embodiment, receiver 305 scans the different channels to determine which channel has the strongest received signal.

Figure 4:
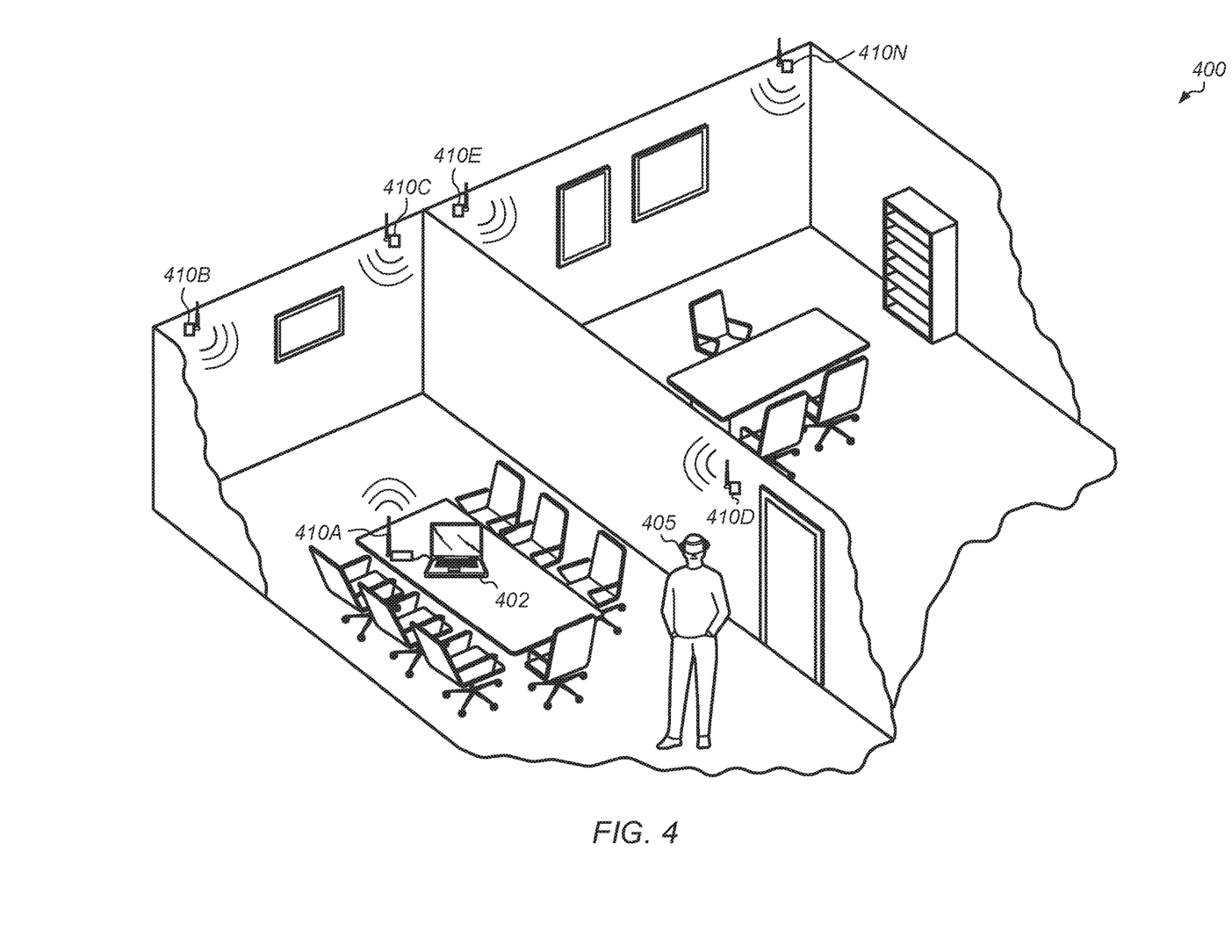
FIG. 4 is a block diagram of one embodiment of a multi-transceiver wireless VR environment.

Turning now to FIG. 4, one embodiment of a multi-transceiver wireless VR environment 400 is shown. In one embodiment, a wireless VR environment 400 includes a plurality of transceivers 410A-N positioned at various locations throughout the environment 400. For example, in one embodiment, transceivers 410B-N are located in the corners of the room to provide good line-of-sight connections to any possible location of the receiver 405 in the wireless VR system. It is assumed for the purposes of this discussion that master transceiver 410A is connected to a video source 402. In one embodiment, the video source 402 includes a graphics card with one or more GPUs.

As the receiver 405 moves about the room, the quality of the signal path from the master transceiver 410A to the receiver 405 can change. The wireless VR system is configured to perform periodic beamforming training procedures to determine a path from master transceiver 410A through transceivers 410A-N to the receiver. In various embodiments, the beamforming training procedure is configured to determine the quality of various signal paths and select a path(s) with a better quality than otherwise. In some cases, the selected path is the path that shows the best signal quality. In other cases, the selected path may not be the path with the best quality, but is a path the still has relatively good quality as compared to other paths. For example, if there is an obstruction between master transceiver 410A and the receiver 405, master transceiver 410A sends the encoded video bitstream to another transceiver 410B-N with a better line of sight connection to the receiver 405. In some cases, master transceiver 410A sends the encoded video bitstream to a first transceiver 410B, the first transceiver 410B sends the encoded video bitstream to a second transceiver 410C, and so on, until the encoded video bitstream is sent to the receiver 405. In this way, the wireless VR system is able to adaptively adjust the path used to convey the encoded video bitstream to the receiver 405 as the operating conditions vary.

Figure 5:
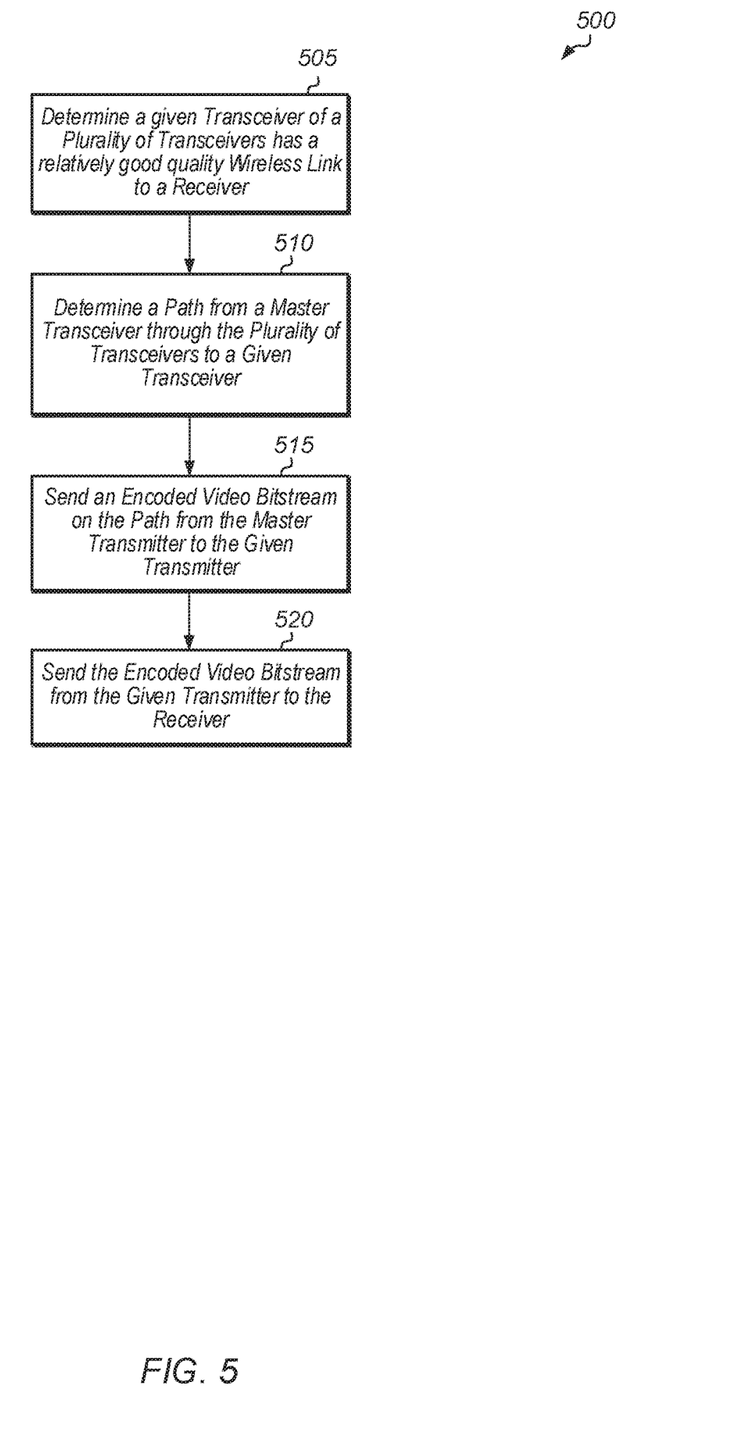
FIG. 5 is a generalized flow diagram illustrating one embodiment of a method for transferring encoded video data to a receiver using a wireless path through a wireless mesh network.
Figure 6:
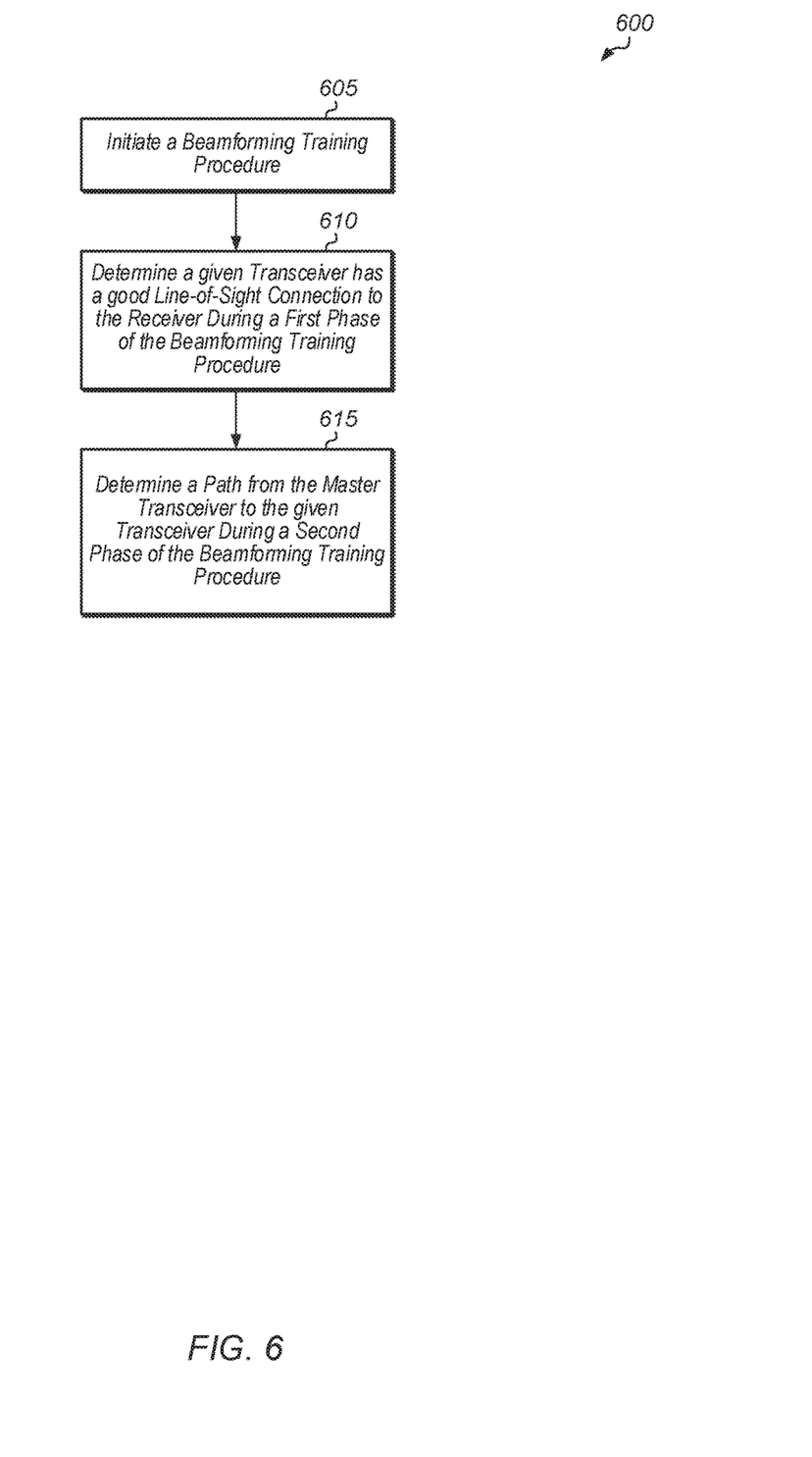
FIG. 6 is a generalized flow diagram illustrating one embodiment of a method for determining a path for transferring an encoded video stream from a master transceiver to a receiver.
Figure 7:
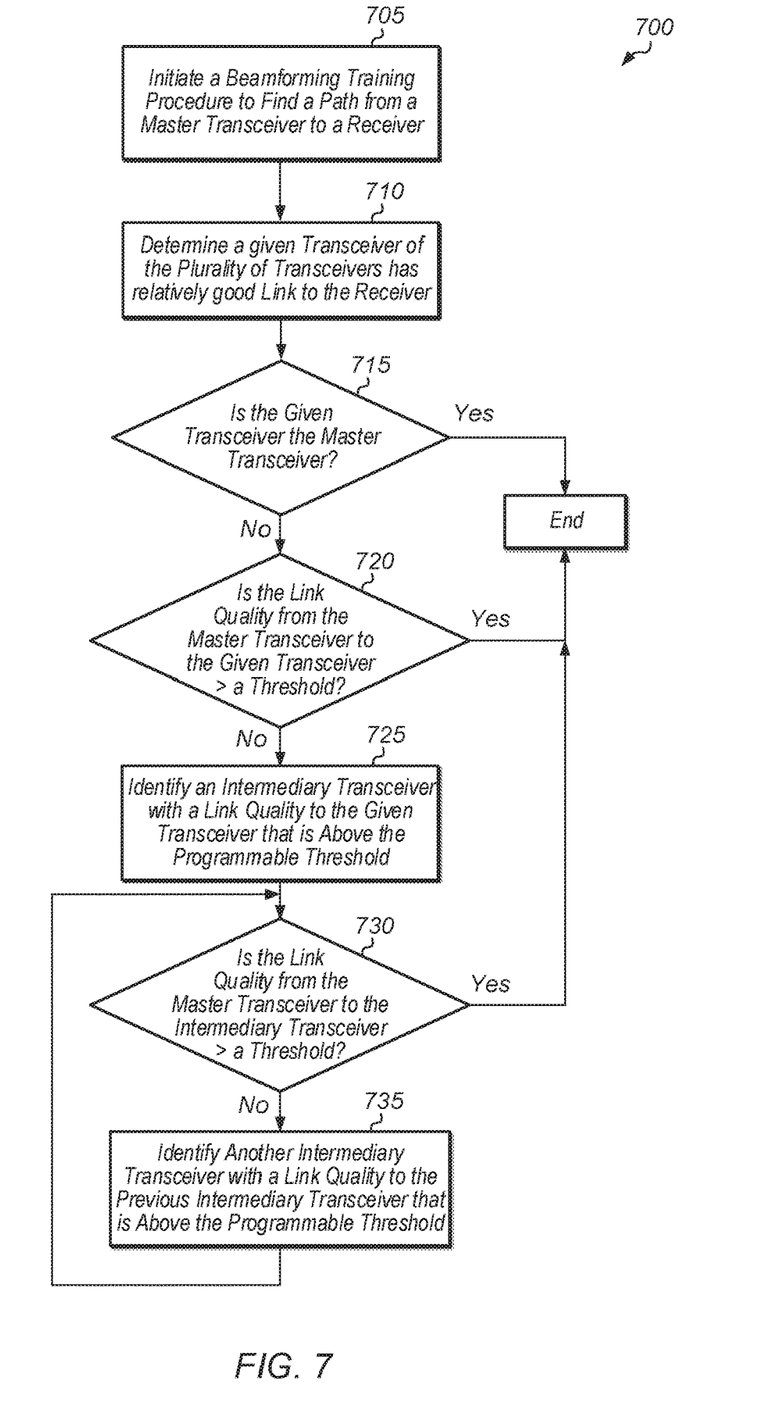
FIG. 7 is a generalized flow diagram illustrating one embodiment of a method for determining a path from a master transceiver to a receiver.
Figure 8:
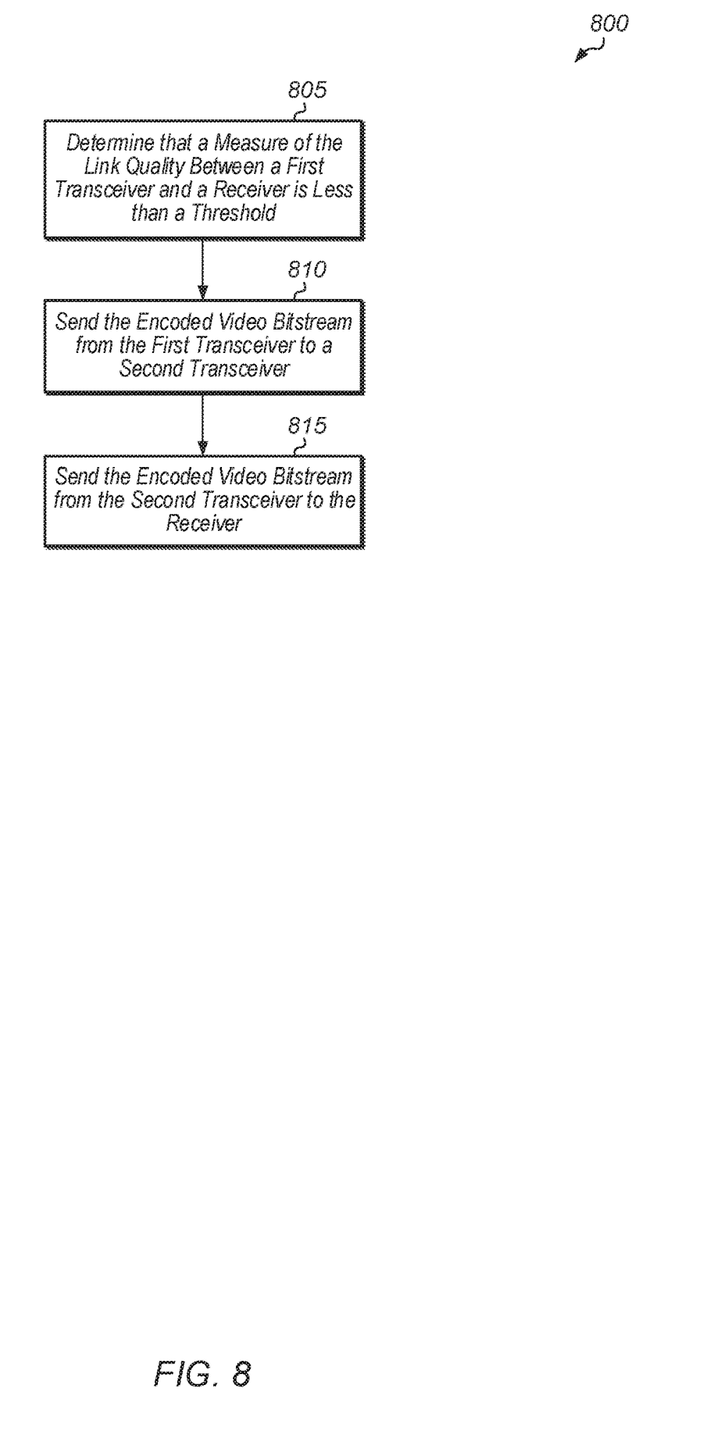
FIG. 8 is a generalized flow diagram illustrating one embodiment of a method for changing a path for conveying an encoded video bitstream to a receiver.

Referring now to FIG. 5, one embodiment of a method 500 for transferring encoded video data to a receiver using a wireless path through a wireless mesh network is shown. For purposes of discussion, the steps in this embodiment and those of FIG. 6-8 are shown in sequential order. However, it is noted that in various embodiments of the described methods, one or more of the elements described are performed concurrently, in a different order than shown, or are omitted entirely. Other additional elements are also performed as desired. Any of the various systems or apparatuses described herein are configured to implement method 500.

A wireless VR system determines which transceiver of a plurality of transceivers has relatively good quality wireless link to a receiver (block 505). In one embodiment, the wireless VR system performs a beamforming training procedure to determine which transceiver has a relatively good wireless link to the receiver. Next, the system determines a path from a master transceiver through the plurality of transceivers to a given transceiver which has a relatively good quality wireless link to the receiver (block 510). In one embodiment, the system identifies a path from the master transceiver to the given transceiver such that each link between transceivers has a link quality greater than a threshold. In this embodiment, the received signal strength of a signal sent on the link can be utilized as a measure of the link quality. In other embodiments, other metrics can be utilized to represent link quality. It is noted that the master transceiver is connected to a video source (e.g., graphics card). Depending on the layout of the VR environment and obstructions within the environment, the path can traverse multiple transceivers in between the master transceiver and the given transceiver. Then, the system sends an encoded video bitstream on the path from the master transceiver to the given transceiver (block 515). Next, the given transceiver sends the encoded video bitstream to the receiver (block 520). After block 520, method 500 ends.

Turning now to FIG. 6, one embodiment of a method 600 for determining a path for transferring an encoded video stream from a master transceiver to a receiver is shown. A wireless VR system initiates a beamforming training procedure (block 605). In one embodiment, the receiver (e.g., HMD) initiates the beamforming training procedure by notifying all of the transceivers in the wireless VR environment that a beamforming training procedure will be performed. In another embodiment, the beamforming training procedure can be performed on a fixed schedule. In this embodiment, the transceivers and receiver of the wireless VR system are synchronized in time so that they can start the beamforming training procedure at the same time.

Next, the wireless VR system determines which transceiver has the best line-of-sight connection to the receiver during a first phase of the beamforming training procedure (block 610). A line-of-sight connection refers to a link between a transceiver and the receiver which is devoid of obstructions. In one embodiment, the best line-of-sight connection is determined by measuring and comparing the signal strength of each transceiver's signals at the receiver. The transceiver that generates a signal with the highest signal strength, as measured by the receiver, is designated as having the best line-of-sight connection to the receiver. In other embodiments, the best line-of-sight connection can be determined during the beamforming training procedure using other suitable techniques.

Then, the wireless VR system determines a path from the master transceiver to the transceiver with a relatively good connection to the receiver during a second phase of the beamforming training procedure (block 615). If the system determines that the master transceiver has the best line-of-sight connection to the receiver in block 610, then block 615 can be skipped. After block 615, method 600 ends. It is noted that method 600 can be performed at various times during operation of the wireless VR system. For example, method 600 can be performed on a periodic basis. Alternatively, method 600 can be performed in response to detecting deterioration in the wireless link and/or the detecting a loss of data being sent over the wireless link.

Referring now to FIG. 7, one embodiment of a method 700 for determining a path from a master transceiver to a receiver is shown. A wireless VR system initiates a beamforming training procedure to find a path to use from a master transceiver to a receiver (block 705). In one embodiment, the wireless VR system has a plurality of transceivers positioned at different locations within the wireless VR environment. During a first phase of the beamforming training procedure, the system determines which transceiver of the plurality of transceivers has a relatively good quality link to the receiver (block 710). For example, in one embodiment, the receiver turns on an omni-directional antenna to receive signals from the plurality of transceivers, and the received signal with the highest signal strength is used to identify the transceiver with a relatively good link to the receiver. If the given transceiver with the relatively good link to the receiver is the master transceiver (conditional block 715, "yes" leg), then method 700 ends. In this case, the encoded video bitstream is sent directly from the master transceiver to the receiver.

If the given transceiver with the relatively good link to the receiver is not the master transceiver (conditional block 715, "no" leg), then the system determines if the link quality from the master transceiver to the given transceiver is above a programmable threshold (conditional block 720). In one embodiment, the system implements another phase of the beamforming training procedure to determine if the link quality of the link from the master transceiver to the given transceiver is above the programmable threshold. If the link quality from the master transceiver to the given transceiver is above the programmable threshold (conditional block 720, "yes" leg), then method 700 ends. In this case, the master transceiver sends the encoded video bitstream to the given transceiver and then the given transceiver sends the encoded video bitstream to the receiver.

If the link quality from the master transceiver to the given transceiver is below the programmable threshold (conditional block 720, "no" leg), then the system identifies an intermediary transceiver with a link quality to the given transceiver that is above the programmable threshold (block 725). In one embodiment, the system implements another phase of the beamforming training procedure to identify an intermediary transceiver with a link quality to the given transceiver that is above the programmable threshold. Next, the system determines if the link quality from the master transceiver to the intermediary transceiver is above the programmable threshold (conditional block 730). If the link quality from the master transceiver to the intermediary transceiver is above the programmable threshold (conditional block 730, "yes" leg), then method 700 ends. In this case, the encoded video bitstream is sent from the master transceiver to the intermediary transceiver to the given transceiver and then to the receiver.

If the link quality from the master transceiver to the intermediary transceiver is less than the programmable threshold (conditional block 730, "no" leg), then the system identifies another intermediary transceiver with a link quality to the previous intermediary transceiver that is above the programmable threshold (block 735). In one embodiment, the system implements another phase of the beamforming training procedure to identify another intermediary transceiver with a link quality to the previous intermediary transceiver that is above the programmable threshold. Next, the system determines if the link quality from the master transceiver to the other intermediary transceiver is above the programmable threshold (conditional block 730). This last phase of method 700 can be repeated any number of times until a suitable path to the receiver is found with each link on the path having a link quality above the programmable threshold.

Turning now to FIG. 8, one embodiment of a method 800 for changing a path for conveying an encoded video bitstream to a receiver is shown. A system determines that a measure of the link quality between a first transceiver and a receiver is less than a threshold (block 805). For example, in a wireless VR system, a user wearing a HMD moves within the VR environment, and an obstruction comes between the first transceiver and the HMD. When this happens, the first transceiver will not have a line-of-sight connection to the receiver. In one embodiment, the system can determine that a measure of the link quality between a first transceiver and a receiver is less than the threshold by performing a beamforming training procedure.

In response to determining that the link quality between the first transceiver and the receiver is less than the threshold, the system sends an encoded video bitstream from the first transceiver to a second transceiver (block 810). In one embodiment, the system determines that a measure of the link quality between the first transceiver and the second transceiver is greater than the threshold by performing a beamforming training procedure. Next, the system sends the encoded video bitstream from the second transceiver to the receiver (block 815). In one embodiment, the system determines that a measure of the link quality between the second transceiver and the receiver is greater than the threshold by performing a beamforming training procedure. After block 815, method 800 ends. It is noted that in other embodiments, the encoded video bitstream can be sent on a path through a plurality of transceivers between the first transceiver and the receiver if the second transceiver does not have a line of sight connection to the receiver.

In various embodiments, program instructions of a software application are used to implement the methods and/or mechanisms described herein. For example, program instructions executable by a general or special purpose processor are contemplated. In various embodiments, such program instructions can be represented by a high level programming language. In other embodiments, the program instructions can be compiled from a high level programming language to a binary, intermediate, or other form. Alternatively, program instructions can be written that describe the behavior or design of hardware. Such program instructions can be represented by a high-level programming language, such as C. Alternatively, a hardware design language (RDL) such as Verilog can be used. In various embodiments, the program instructions are stored on any of a variety of non-transitory computer readable storage mediums. The storage medium is accessible by a computing system during use to provide the program instructions to the computing system for program execution. Generally speaking, such a computing system includes at least one or more memories and one or more processors configured to execute program instructions.

It should be emphasized that the above-described embodiments are only non-limiting examples of implementations. Numerous variations and modifications will become apparent to those skilled in the art once the above disclosure is fully appreciated. It is intended that the following claims be interpreted to embrace all such variations and modifications.

What is claimed is:

1. A system comprising:
    a plurality of transceivers, including a master transceiver configured to initiate a procedure to find a communication path from the master transceiver to a receiver, each configured to transmit a video bitstream to another transceiver; and
    wherein the system is configured to:
        identify a given transceiver of the plurality of transceivers that has a first link quality to the receiver that meets a threshold;
        in response to determining the given transceiver is the master transceiver, transmit bitstream data directly from the master transceiver to the receiver;
        in response to determining the given transceiver is not the master transceiver, determine a path through the plurality of transceivers from the master transceiver to the receiver via the given transceiver, wherein the path comprises at least one intermediary transceiver different from the master transceiver and the given transceiver, wherein to determine the path the master transceiver is configured to:
            determine if the intermediary transceiver has a second link quality to the given transceiver greater than a threshold;
                if the second link quality of the intermediary transceiver to the given transceiver is greater than the threshold, and a third link quality from the master transceiver to the intermediary transceiver is greater than the threshold:
                    send an encoded video bitstream via the at least one intermediary transceiver on the path from the master transceiver to the given transceiver; and
                    send the encoded video bitstream from the given transceiver to the receiver;
                if the third link quality between the master transceiver and the intermediary transceiver is not greater than the threshold, search for another transceiver that has a fourth link quality to the given transceiver that does meet the threshold.

2. The system as recited in claim 1, wherein the system is configured to perform a first phase of a beamforming training procedure to measure link quality from the plurality of transceivers to the receiver, and wherein a transceiver with a highest signal strength as measured at the receiver is selected as the given transceiver.

3. The system as recited in claim 2, wherein the receiver is configured to measure a signal strength for each transceiver of the plurality of transceivers during the first phase of the beamforming training procedure, and wherein the system is configured to perform a second phase of the beamforming training procedure to determine the path from the master transceiver to the given transceiver.

4. The system as recited in claim 1, wherein:
each transceiver of the plurality of transceivers is configured to utilize a different channel from others of the plurality of transceivers to transmit during a first phase of a beamforming training procedure; and
the receiver is configured to turn on an omni-direction antenna during the first phase of the beamforming training procedure to determine which channel has a strongest received signal.

5. The system as recited in claim 1, wherein the master transceiver is connected to a video source which renders a video bitstream, and wherein the video source is a graphics card comprising one or more graphics processing units.

6. The system as recited in claim 1, wherein:
each transceiver of the plurality of transceivers is configured to turn on an omni-directional antenna and transmit at a same time and a same power as others of the plurality of transceivers; and
the receiver is configured to determine which transceiver has a best line of sight to the receiver based on a direction of a strongest received signal, wherein the receiver knows a location of each transceiver of the plurality of transceivers.

7. A method comprising:
initiating, by a master transceiver of a plurality of transceivers, a procedure to find a communication path from the master transceiver to a receiver, each of the plurality of transceivers being configured to transmit a video bitstream to another transceiver;
identifying a given transceiver of the plurality of transceivers that has a first link quality to the receiver that meets a threshold;
in response to determining the given transceiver is the master transceiver, transmitting bitstream data directly from the master transceiver to the receiver;
in response to determining the given transceiver is not the master transceiver, determining a path through the plurality of transceivers from the master transceiver to the receiver via the given transceiver, wherein the path comprises at least one intermediary transceiver different from the master transceiver and the given transceiver, wherein determining the path comprises:
determining if the intermediary transceiver has a second link quality to the given transceiver greater than a threshold;
if the second link quality of the intermediary transceiver to the given transceiver is greater than the threshold, and a third link quality from the master transceiver to the intermediary transceiver is greater than the threshold:
sending an encoded video bitstream via the at least one intermediary transceiver on the path from the master transceiver to the given transceiver; and
sending the encoded video bitstream from the given transceiver to the receiver;
if the third link quality between the master transceiver and the intermediary transceiver is not greater than the threshold, searching for another transceiver that has a fourth link quality to the given transceiver that does meet the threshold.

8. The method as recited in claim 7, further comprising performing a first phase of a beamforming training procedure to measure the link quality from the plurality of transceivers to the receiver, and wherein a transceiver with a highest signal strength as measured at the receiver is selected as the given transceiver.

9. The method as recited in claim 8, further comprising measuring, by the receiver, a signal strength for each transceiver of the plurality of transceivers during the first phase of the beamforming training procedure, and performing a second phase of the beamforming training procedure to determine the path from the master transceiver to the given transceiver.

10. The method as recited in claim 7, further comprising utilizing, by each transceiver of the plurality of transceivers, a different channel from others of the plurality of transceivers to transmit during a first phase of a beamforming training procedure, and turning on, by the receiver, an omni-direction antenna during the first phase of the beamforming training procedure to determine which channel has a strongest received signal.

11. The method as recited in claim 7, wherein the master transceiver is connected to a video source which renders a video bitstream, and wherein the video source is a graphics card comprising one or more graphics processing units.

12. The method as recited in claim 7, further comprising identifying the intermediary transceiver as having a link quality to the given transceiver greater than the threshold.

13. The method as recited in claim 7, further comprising turning on, by each transceiver of the plurality of transceivers, an omni-directional antenna and transmitting at a same time and a same power as others of the plurality of transceivers, and determining, by the receiver, which transceiver has a best line of sight to the receiver based on a direction of a strongest received signal, wherein the receiver knows a location of each transceiver of the plurality of transceivers.

14. A system method comprising:
selecting a given transceiver of a plurality of transceivers, each configured to transmit a video bitstream to another transceiver, based on a measure of a link quality from the given transceiver to a receiver;
determining a path through the plurality of transceivers from a master transceiver to the given transceiver, wherein the path comprises at least one intermediary transceiver different from the master transceiver and the given transceiver;
wherein determining the path comprises:
determining the intermediary transceiver has a first link quality to the given transceiver greater than a threshold; and
determining a second link quality from the master transceiver to the intermediary transceiver is greater than the threshold;
sending an encoded video bitstream via the at least one intermediary transceiver on the path from the master transceiver to the given transceiver; and
sending the encoded video bitstream from the given transceiver to the receiver;
wherein each transceiver of the plurality of transceivers is configured to turn on an omni-directional antenna and transmit at a same time and a same power as others of the plurality of transceivers; and
the receiver is configured to determine which transceiver has a best line of sight to the receiver based on a direction of a strongest received signal, wherein the receiver knows a location of each transceiver of the plurality of transceivers.

15. The method as recited in claim 14, further comprising performing a first phase of a beamforming training procedure to measure the link quality from the plurality of transceivers to the receiver, and wherein a transceiver with a highest signal strength as measured at the receiver is selected as the given transceiver.

16. The method as recited in claim 15, further comprising measuring, by the receiver, a signal strength for each transceiver of the plurality of transceivers during the first phase of the beamforming training procedure, and performing a second phase of the beamforming training procedure to determine the path from the master transceiver to the given transceiver.

17. The method as recited in claim 14, further comprising utilizing, by each transceiver of the plurality of transceivers, a different channel from others of the plurality of transceivers to transmit during a first phase of a beamforming training procedure, and turning on, by the receiver, an omni-direction antenna during the first phase of the beamforming training procedure to determine which channel has a strongest received signal.

18. The method as recited in claim 14, wherein the master transceiver is connected to a video source which renders a video bitstream, and wherein the video source is a graphics card comprising one or more graphics processing units.

19. The method as recited in claim 14, further comprising identifying the intermediary transceiver with the first link quality to the given transceiver being greater than the threshold.

* * * * *

UNITED STATES PATENT AND TRADEMARK OFFICE
CERTIFICATE OF CORRECTION

PATENT NO. : 11,398,856 B2
APPLICATION NO. : 15/832448
DATED : July 26, 2022
INVENTOR(S) : Vu et al.

It is certified that error appears in the above-identified patent and that said Letters Patent is hereby corrected as shown below:

In the Claims

Column 12, Claim 8, Line 3, please delete "measure the link" and insert -- measure link --.

Column 12, Claim 14, Line 37, please delete "A system method" and insert -- A method --.

Signed and Sealed this
Twentieth Day of September, 2022

Katherine Kelly Vidal
*Director of the United States Patent and Trademark Office*